(12) United States Patent
Choi

(10) Patent No.: US 8,675,523 B2
(45) Date of Patent: Mar. 18, 2014

(54) OPTIMIZED SPANNING TREE CONSTRUCTION BASED ON PARAMETER SELECTION

(75) Inventor: Byung Kyu Choi, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 11 days.

(21) Appl. No.: 13/483,498

(22) Filed: May 30, 2012

(65) Prior Publication Data

US 2013/0322299 A1    Dec. 5, 2013

(51) Int. Cl.
    *H04L 12/28* (2006.01)
(52) U.S. Cl.
    USPC .......................................... 370/256
(58) Field of Classification Search
    USPC .......... 370/238, 252, 254–256, 400, 401; 709/252
    See application file for complete search history.

(56) References Cited

U.S. PATENT DOCUMENTS

| | | | |
|---|---|---|---|
| 7,616,589 B2 * | 11/2009 | Nagata et al. | 370/256 |
| 7,804,791 B2 | 9/2010 | Farkas et al. | |
| 8,045,488 B2 | 10/2011 | Swan | |
| 2006/0268747 A1 * | 11/2006 | van Haalen et al. | 370/256 |
| 2009/0022070 A1 * | 1/2009 | Iovanna et al. | 370/256 |
| 2010/0165884 A1 | 7/2010 | Farkas et al. | |
| 2012/0039161 A1 | 2/2012 | Allan et al. | |

OTHER PUBLICATIONS

Slattery, T., Spanning Layer 2 Between Data Centers, (Research Paper), Feb. 16, 2010.

* cited by examiner

*Primary Examiner* — Kerri Rose
(74) *Attorney, Agent, or Firm* — Neel Patel (57) ABSTRACT

Embodiments herein relate to optimized spanning tree construction based on parameter selection. A selected parameter of a bridged packet-switched network is correlated to an algorithm. A spanning tree is constructed based on the correlated algorithm.

20 Claims, 5 Drawing Sheets

OPTIMIZED SPANNING TREE CONSTRUCTION BASED ON PARAMETER SELECTION

BACKGROUND

Network topology relates to a layout pattern of interconnections of the various network elements, such as nodes and links, of a computer network. Network topologies may be physical or active. Physical topology refers to the physical design of a network including the devices, location and cable installation. Active topology refers to how data is transferred in the network from one device to the next, without regard to the physical design. Though a path electrical signals take between nodes in the physical topology may at least somewhat match a flow of data in the active topology.

For example, the physical topology of the network may be defined by a layout of cabling, the locations of nodes, and the interconnections between the nodes and the cabling. However, the active topologies may be determined by network protocols, such as the Spanning Tree Protocol (STP), Rapid Spanning Tree Protocol (RSTP), VLAN Spanning Tree Protocol (VSTP) and Multiple Spanning Tree Protocol (MSTP).

The network protocols may apply graph theory and algorithms associated therewith to create a minimum spanning tree for the routing of data through the network. The spanning tree may define a tree composed of all the nodes and at least some of the edges of a connected, undirected graph, in which no cycles or loops are formed. For example, the STP may ensure a loop-free topology for any bridged Ethernet LAN. As a result, network planning may be significantly simplified as a network administrator need not be concerned about the resulting cabling of the physical topology, which may readily create loops.

BRIEF DESCRIPTION OF THE DRAWINGS

The following detailed description references the drawings, wherein.

DETAILED DESCRIPTION

Spanning trees may be used in bridged packet-switched networks, such as bridged local area networks (LANS), to determine paths data, such as Layer 2 frames, may take to travel between different nodes, such as switches or bridges. For example, the STP may create a spanning tree within a mesh network of connected layer-2 bridges, and disables those links that are not part of the spanning tree, leaving a single active path between any two nodes of the network. Thus, a bridge may not forward a packet along a path that is not part of the spanning tree.

Spanning trees therefore not only determine the active topology but also other performance related parameters including aggregate link bandwidth utilization, the length of forwarding path, and the maintainability of the active topology with a network disturbance. As such, spanning trees that best utilize the underlying physical topologies and resources are often sought.

In small networks, a performance variation with different spanning trees may be negligible. However, networks have grown in size. For example, data centers may generally include layer-2 networks having over 10,000 virtual machines on over 500 servers, connected to a large number of bridges or switches. In such large networks, a non-negligible inefficiency of spanning trees has been recognized, especially in data centers, which are often performance-critical. Problems with such spanning trees include low utilization of aggregate link bandwidth, circuitous forwarding paths, inability to use shortest paths, and non-negligible convergence time with a network disturbance.

For example, data centers have unique characteristics primarily due to the typically large number of servers, unprecedented amount of traffic at one place and inexperienced traffic patterns. The sheer size of data centers is challenging for spanning trees because logically, a large network can create an intractably large number of possible spanning trees. For instance, the current practice is to determine a core bridge and assign the highest priority thereto. The next highest priorities are assigned to the bridges closest to the core bridge. In this manner, the canonical form of a typical hierarchical network architecture will have three levels of switches (core, aggregation, and edge), where edge bridges are assigned the lowest priorities.

While this hierarchy may perform well for small or medium networks, it is generally unable to efficiently or fully support the new pattern of traffic dynamics of large networks, such as data centers, against the available aggregate link bandwidth. Thus, the standard network protocols, such as STP, RSTP, MSTP, do not necessarily produce optimal spanning trees. Moreover, a network administrator lack tools to even evaluate an optimality of the spanning tree constructed by the standard network protocols. Further, attempting to optimize a large spanning tree by relying solely on the network administrator's experience, intuition and knowledge would be unreliable, difficult to practice and overly time consuming. In fact, the network administrator may lack the experience to even optimize such architectures.

Embodiments may provide one or more optimized spanning trees and allow the network administrator to choose the best spanning tree for a given optimization goal. For example, an embodiment may collect information about a physical topology and link bandwidth of the network, produce a common data structure of the physical topology, allow the network administrator to choose the desired site specific optimization goals, and then show the one or more spanning tree maps optimized with the performance metrics selected by the network administrator. By providing the priority of the bridges in the optimized spanning tree maps, the network administrator can easily reconstruct or modify the spanning tree as desired. Thus, the network administrator may avoid attempting to manually enumerate all the possible spanning trees in an effort to find the spanning trees that best support the network traffic dynamics. For large networks, such manual work would be very difficult, extremely time consuming, and prone to human error.

Figure 1:
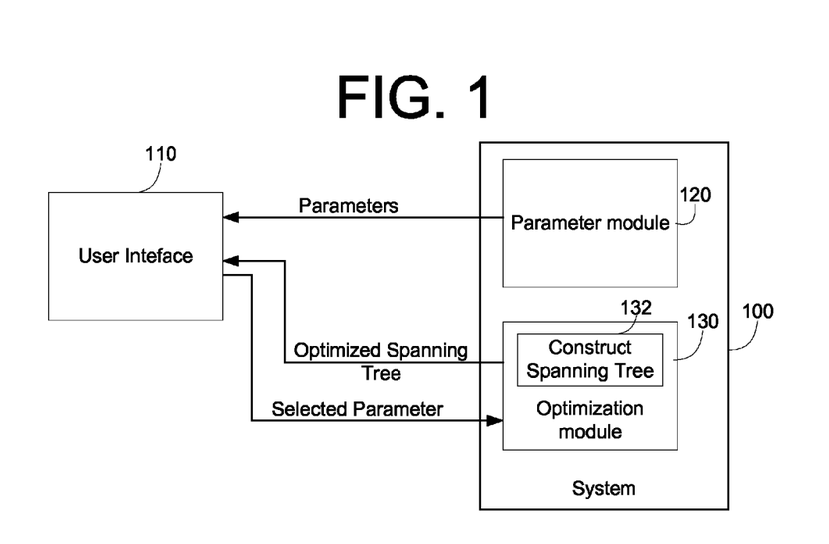
FIG. 1 is an example block diagram of a system for optimized spanning tree construction based on parameter selection.

Referring now to the drawings, FIG. 1 is an example block diagram of a system 100 for optimized spanning tree construction based on parameter selection. The system 100 may be included in a storage device, computer, switch, enclosure, server, controller and/or any type of device capable of managing network elements. The system 100 may also complement or be a part of a network management system (NMS) (not shown). The NMS may be a combination of hardware and/or software used to monitor and administer a computer network (not shown). For example, the NMS may manage network elements (not shown) for faults, configuration, accounting, performance, and security (FCAPS) management. The NMS may also be responsible for discovering network inventory, monitoring device health and status, providing alerts to conditions that impact system performance, and identification of problems, their source(s) and possible solutions.

In the embodiment of FIG. 1, the system 100 includes a parameter module 120 and an optimization module 130. The system 100 is further shown to communicate with a user interface 110. The parameter and optimization modules 120 and 130 may include, for example, a hardware device including electronic circuitry for implementing the functionality described below, such as control logic and/or memory. In addition or as an alternative, the parameter and optimization modules 120 and 130 may be implemented as a series of instructions encoded on a machine-readable storage medium and executable by a processor.

The parameter module 120 is to provide one or more parameters related to a performance of a bridged packet-switched network (not shown) to the user interface 110. The user interface 110 may be any type of device that allows a user, such as a network administrator, to interact with the system 100. For example, the user interface 110 may include a keyboard, mouse, display, Graphical user interface (GUI), touchscreen, and the like. Examples of the one or more parameters will be explained below with respect to FIG. 2.

The optimization module 130 is to construct one or more optimized spanning trees 132 based on the one or more parameters selected at the user interface 110. Each of the one or more optimized spanning trees is optimized according to at least one of the one or more parameters. The optimization module 130 is to determine a priority of at least a node (not shown) of the one or more optimized spanning trees 132 based on the one or more selected parameters.

In one embodiment, at least one of the nodes of the one or more optimized spanning trees 132 may correspond to a bridge and at least one edge of the one or more optimized spanning trees may correspond to a link connecting to at least one of the bridges. The network may be a mesh network and the bridge may be a Layer 2 switch. The optimization module 130 will be explained in further detail below with respect to FIG. 2. An example of the optimized spanning tree is explained below with respect to FIG. 3.

Figure 2:
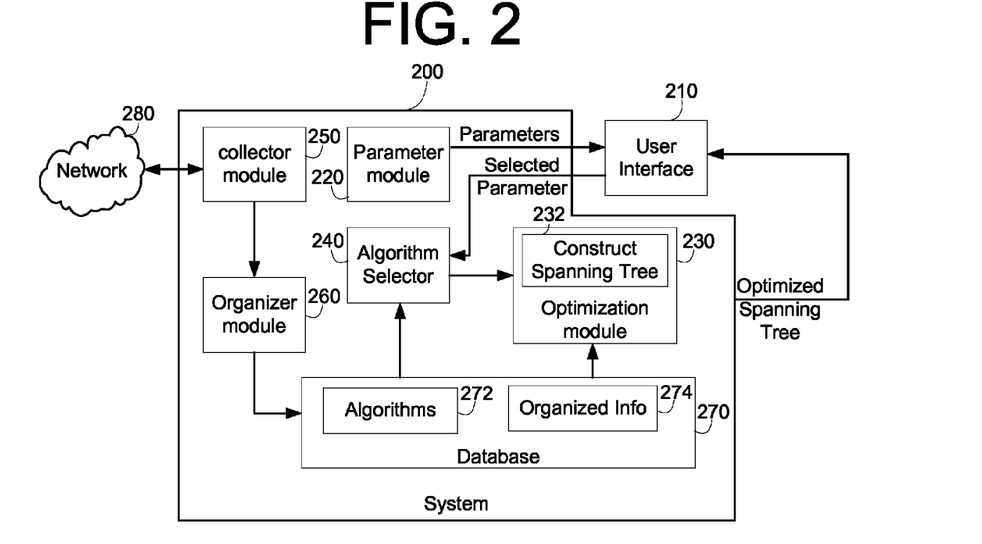
FIG. 2 is another example block diagram of a system for optimized spanning tree construction based on parameter selection.

FIG. 2 is another example block diagram of a system 200 for optimized spanning tree construction based on parameter selection. The system 200 may be included in a storage device, computer, switch, enclosure, server, controller and/or any type of device capable of managing network elements. The system 100 may also complement or be a part of an NMS (not shown).

In the embodiment of FIG. 2, the system 200 includes a parameter module 220, an optimization module 230, an algorithm selector 240, a collector module 250, an organizer module 260, and a database 270. The system 200 further connects to a user interface 210 and a network 280. The parameter module 220 of FIG. 2 may at least include the functionality of the parameter module 120 of FIG. 1 and the optimization module 230 of FIG. 2 may at least include the functionality of the optimization module 130 of FIG. 1. The user interface 210 of FIG. 2 may be similar to the user interface 110 of FIG. 1.

The algorithm selector 240, collector module 250 and organizer module 260 may include, for example, a hardware device including electronic circuitry for implementing the functionality described below, such as control logic and/or memory. In addition or as an alternative, the algorithm selector 240, collector module 250 and organizer module 260 may be implemented as a series of instructions encoded on a machine-readable storage medium and executable by a processor. The database 270 may be any electronic, magnetic, optical, or other physical storage device that contains or stores information, such as Random Access Memory (RAM), an Electrically Erasable Programmable Read-Only Memory (EEPROM), a storage drive, a Compact Disc Read Only Memory (CD-ROM), and the like. The network 280 may be a bridged packet-switched network, such as a bridged LAN.

The collector module 250 is to collect information related to a physical topology, an active topology, spanning trees, VLANs and other types of maps of the network 280. For example, the collector module 250 may communicate with at least one of the nodes of the network 280 to collect the information. The collector module 250 may also collect other information such as a type, identifier, model name and number, serial number, manufacturer name, configuration controls, processing power, and bandwidth of the nodes.

Example protocols for communicating with at least one of the nodes may include the Link Layer Discovery Protocol (LLDP), Simple Network Management Protocol (SNMP), Dynamic Host Configuration Protocol (DHCP), Simple Service Discovery Protocol (SSDP), Universal Plug and Play (UPnP) and the like. As noted above, the physical topology may relate to distances between nodes, physical interconnections, transmission rates, and/or signal types while the active topology may relate to the paths or links of the physical topology on which the packets are allowed to travel.

The organizer module 260 is to organize the collected information into a format, such as into an adjacency list format, and send the organized information to the database 270. The database 270 is to store the organized information 274 related to the topology of the network 280. The database 270 is also to store a plurality of algorithms 272, as explained below. Further, the database 270 may be updatable with new algorithms, such as those provided by a third party via an open interface plug-in protocol. For example, there are many optimized spanning tree algorithms publicly available.

As noted above, the parameter module 220 is provide one or more parameters to the user interface 210, where a user, such as the network administrator, may choose one or more of the parameters. Example parameters may relate to aggregate link bandwidth utilization, a length of a forwarding path, a bandwidth at a node, a maintainability of an active topology of the network with a disturbance, and the like. Regarding aggregate link bandwidth utilization, a spanning tree is generally limited to covering one VLAN. In this embodiment, one of the parameters may relate allowing the user to explore an effect on aggregate link bandwidth utilization if a single spanning tree spans more than one VLAN, thus optimizing bandwidth distribution and increasing total bandwidth.

In another example, one of the parameters may allow the user to set a maximum and/or minimum forwarding path for at least one of the nodes. For instance, it may be desirable to allow for longer forwarding paths for less active nodes and/or decrease forwarding paths for more active nodes, in order to increase throughput and/or reduce latency. In yet another example, one of the parameters may allow the user to set a maximum and/or minimum bandwidth for one of the nodes. For instance, a core node may require greater bandwidth than edges nodes in a spanning tree, thus reducing bandwidth bottlenecks.

When there is a disturbance in the network 280, such as a link failing, the spanning tree may need to change its structure and reroute data to compensate for the disturbance. This change may also include splitting a single spanning tree into multiple spanning trees. A time needed to change the structure may directly correlate to a previous shape of the spanning tree. Thus, in still another example, one of the parameters may allow the user to construct the spanning tree so as to either increase or decrease a time for the spanning tree to heal after the disturbance.

The algorithm selector 240 is to select at least one of the plurality of algorithms 272 based on the selected one or more parameters. Example algorithms may relate to minimizing communication between nodes, setting a maximum length of a path from at least one of the nodes, setting a maximum bandwidth through at least one of the nodes, allocating bandwidth between a plurality of the nodes, and the like.

For example, the parameter relating to aggregate link bandwidth utilization may correspond to the algorithm relating to allocating bandwidth between a plurality of the nodes. For instance, this algorithm may be optimal where logical partitions of VLANs needs to be better exploited. Spanning trees constructed by this algorithm will make use of the heuristics for better traffic engineering, e.g. link bandwidth utilization.

In another example, the parameter relating to maintainability of an active topology of the network 280 with a disturbance may correspond to the algorithm relating to minimizing communication between nodes. For instance, this algorithm may be optimal for spanning trees in which the physical topologies change frequently because the spanning trees constructed by this algorithm will minimize the number of communications between bridges at the event of a change in the physical topology.

In yet another example, the parameter relating to length of a forwarding path may correspond to the algorithm relating to setting a maximum length of a path from at least one of the nodes. For instance, this algorithm may be optimal where the forwarding path needs to be limited to some length. Spanning trees constructed by this algorithm may limit the maximum forwarding path to some constraint without losing the general requirements of spanning tree: connectivity and loop-freeness.

In still another example, the parameter relating to a bandwidth at a node may correspond to the algorithm relating setting a maximum bandwidth through at least one of the nodes. For instance, this algorithm may be optimal where a specific amount of link bandwidth needs to be guaranteed at the core bridge. Here, a sum of traffic generated by a sub-tree may not exceed the link bandwidth of the core bridge.

The optimization module 230 is to output the one or more optimized spanning trees to a display (not shown) based on the at least one selected algorithm and the organized information. For example, the optimization module 230 may gather the organized information from the database 270 to determine the current physical topology and/or active topology based on a current spanning tree generated by a standard network protocol, such as STP. Then, the optimization module 230 may execute the at least one selected algorithm on the gathered information to construct and output the one or more optimized spanning trees 230. An operation of the algorithm may depend on a value indicated for the associated parameter.

For instance, different parametric values for a path length or node bandwidth may result in different type of spanning trees being construed by the corresponding algorithms.

In one embodiment, the display (not shown) may be included in the user interface 210. Thus, embodiments may find optimal spanning trees independently of routine network administration. For instance, the network administrator may no longer have to be responsible for constructing optimal spanning trees for some specific goal of the network 280, especially for large scale spanning trees in which human error is more likely.

Figure 3:
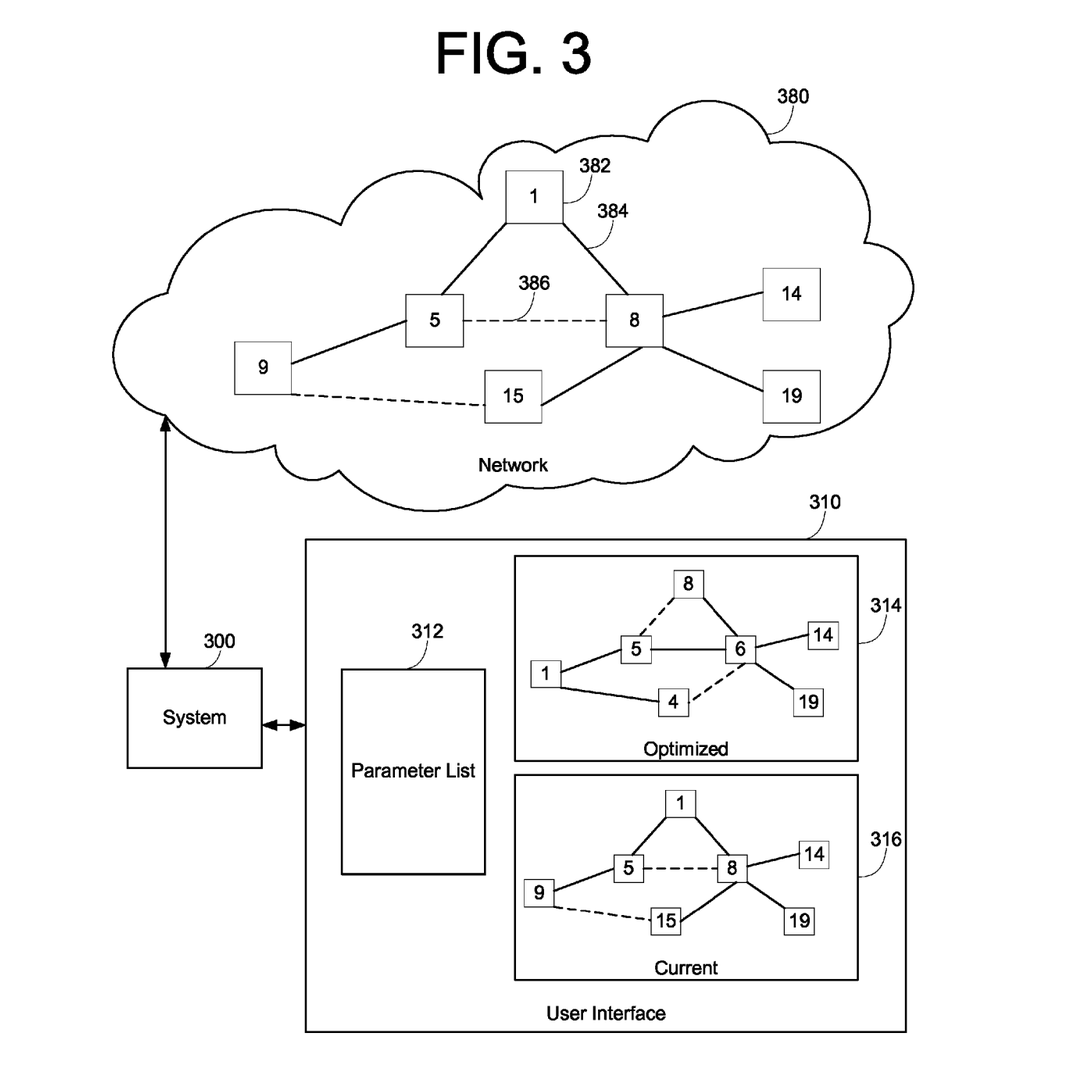
FIG. 3 is an example block diagram of a network with a system for optimized spanning tree construction based on parameter selection.

FIG. 3 is an example block diagram of a network 380 with a system 300 for optimized spanning tree construction based on parameter selection. The embodiment of FIG. 3 includes the system 300 connected to the network 380 and a user interface 310. The system 300 may include the functionality of system 100 of FIG. 1 and/or the system 200 of FIG. 2 while the user interface 310 of FIG. 3 may include the functionality of the user interface 110 of FIG. 1. Here, the user interface 310 is shown to include a graphical user interface (GUI). Further, the network 380 may include the functionality of the network 280 of FIG. 2.

As shown in the network 380 of FIG. 3, a current spanning tree may initially be constructed based on a standard network protocol, such as the RSTP (Rapid STP). The system 300 may collect, organize and output the topological information of the network 380 to the user interface 310, as shown by a current window 316. For example, the current window 316 shows the physical topology and the active topology of the network 380, where the solid lines 384 indicate active links and the dotted lines 386 indicated links that have been disabled by the current spanning tree. Further, a number inside each of the bridges 382 indicates a priority of the bridge thereof. As shown in the network 380, the STP assigns the root bridge to have the lowest priority number with bridges in successively lower hierarchies to have higher priority numbers.

The system 300 also outputs a list of parameters for the user to select from, as shown by a parameter list window 312. As explained above, if user selects a parameter, the system 300 may generate an optimized spanning tree based on the algorithm corresponding to the selected parameter, as shown in an optimized window 314. Thus, the user may compare side-by-side the current and optimized spanning trees. In the embodiment of FIG. 3, the optimized spanning tree has a different priority for three of the bridges, including the core bridge, compared to the current spanning tree. Further, a different set of links have been disabled in the optimized spanning tree, compared to the current spanning tree.

In one embodiment, the user may manually change one or more priorities or links of the current spanning tree implemented in the network 380 to match that of the optimized spanning tree. Alternatively, the system 300 may carry out any of the above changes, such as automatically or in response to a user command. The system 300 is not limited to outputting the information shown in the windows 312, 314, and 316 of the user interface 310 shown in FIG. 3, and may also output other types of management objects, such as a plurality of optimized spanning trees.

Figure 4:
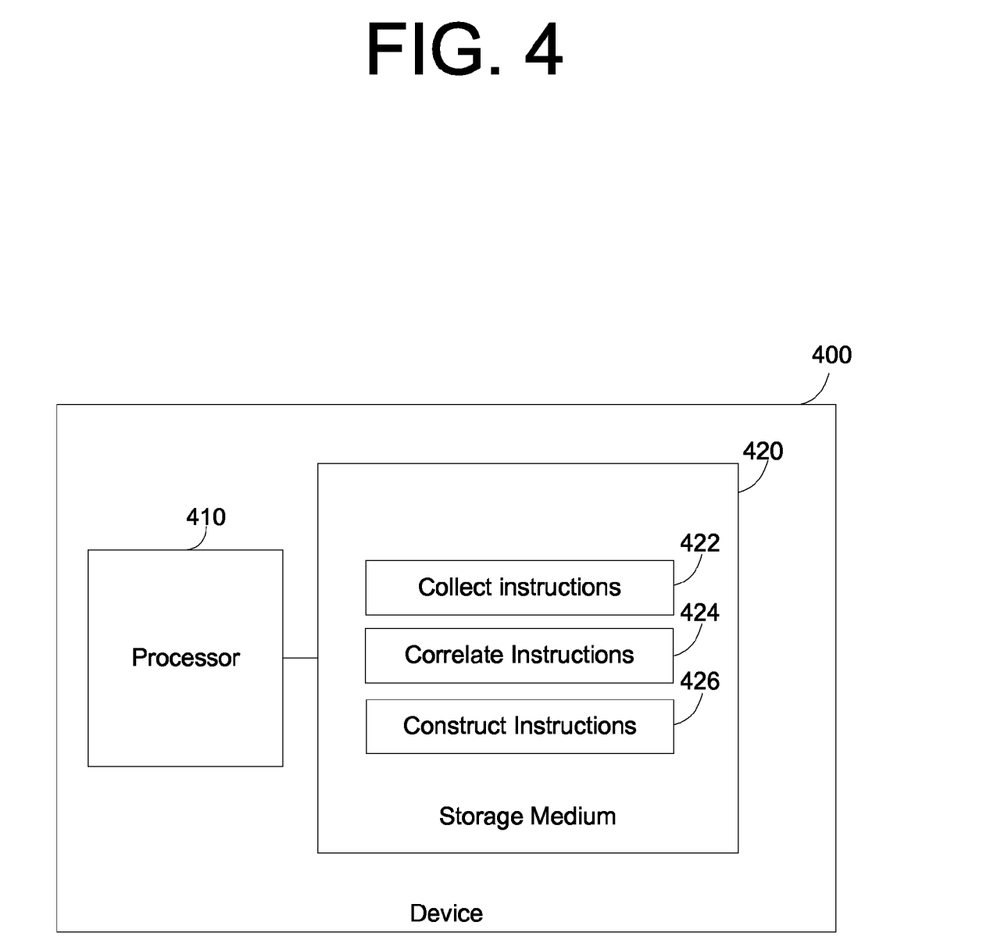
FIG. 4 is an example block diagram of a computing device including instructions for optimized spanning tree construction based on parameter selection.

FIG. 4 is an example block diagram of a computing device 400 including instructions for optimized spanning tree construction based on parameter selection. In the embodiment of FIG. 4, the computing device 400 includes a processor 410 and a machine-readable storage medium 420. The machine-readable storage medium 420 further includes instructions 422, 424 and 426 for optimized spanning tree construction based on parameter selection.

The computing device 400 may be, for example, a server, a notebook computer, a desktop computer, a slate computing device, or any other type of user device capable of executing the instructions 422, 424 and 426. In certain examples, the computing device 400 may include or be connected to additional components such as memories, sensors, displays, etc.

The processor 410 may be, at least one central processing unit (CPU), at least one semiconductor-based microprocessor, at least one graphics processing unit (GPU), other hardware devices suitable for retrieval and execution of instructions stored in the machine-readable storage medium 420, or combinations thereof. The processor 410 may fetch, decode, and execute instructions 422, 424 and 426 for optimized spanning tree construction based on parameter selection. As an alternative or in addition to retrieving and executing instructions, the processor 410 may include at least one integrated circuit (IC), other control logic, other electronic circuits, or combinations thereof that include a number of electronic components for performing the functionality of instructions 422, 424 and 426.

The machine-readable storage medium 420 may be any electronic, magnetic, optical, or other physical storage device that contains or stores executable instructions. Thus, the machine-readable storage medium 420 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 420 can be non-transitory. As described in detail below, machine-readable storage medium 420 may be encoded with a series of executable instructions for optimized spanning tree construction based on parameter selection.

Figure 5:
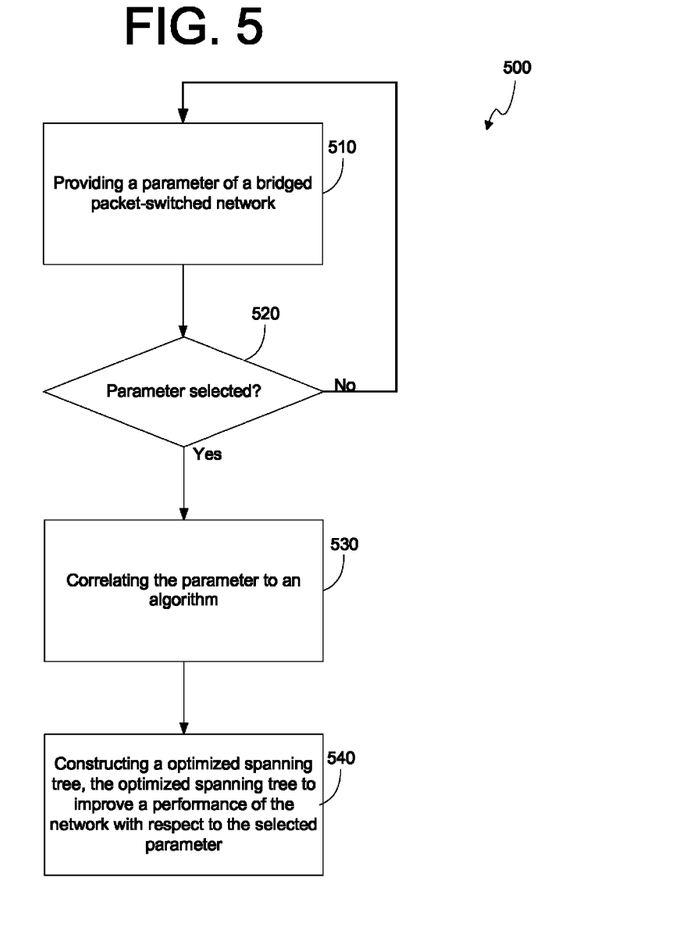
FIG. 5 is an example flowchart of a method for optimized spanning tree construction based on parameter selection.
Figure 6:
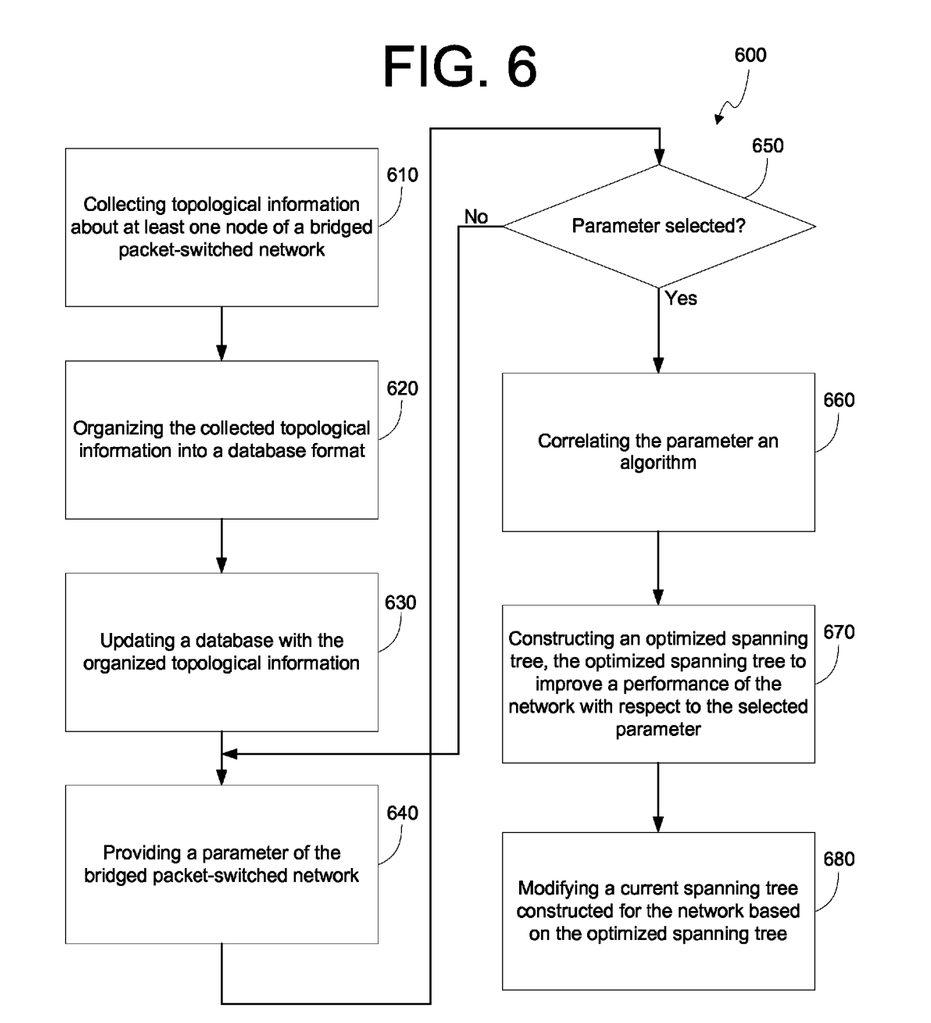
FIG. 6 is another example flowchart of a method for optimized spanning tree construction based on parameter selection.

Moreover, the instructions 422, 424 and 426 when executed by a processor (e.g., via one processing element or multiple processing elements of the processor) can cause the processor to perform processes, such as, the processes of FIGS. 5 and 6. For example, the collect instructions 422 may be executed by the processor 410 to collect topological information about a bridged packet-switched network (not shown). The correlate instructions 424 may be executed by the processor 410 to correlate a selected parameter (not shown) related to a performance of the network to an algorithm (not shown). The construct instructions 426 may be executed by the processor 410 to construct an optimized spanning tree (not shown) based on the parameter and topological information. A priority of a node of the optimized spanning tree may be based on the correlated algorithm, as explained above.

The machine-readable storage medium 420 may also include instructions (not shown) to provide a plurality of parameters of a bridged packet-switched network to a user for selection and to output the optimized spanning tree to the user. One of the plurality of parameters selected by the user is to be the selected parameter.

FIG. 5 is an example flowchart of a method 500 for optimized spanning tree construction based on parameter selection. Although execution of the method 500 is described below with reference to the system 200, other suitable components for execution of the method 500 can be utilized, such as the system 100. Additionally, the components for executing the method 500 may be spread among multiple system and/or devices (e.g., a processing device in communication with input and output devices). In certain scenarios, multiple devices acting in coordination can be considered a single device to perform the method 500. The method 500 may be implemented in the form of executable instructions stored on a machine-readable storage medium, such as storage medium 420, and/or in the form of electronic circuitry.

At block 510, the system 200 provides a parameter of a bridged packet-switched network 280 and then flows to block 520 to determine if the parameter is selected. If the parameter is not selected, the system 200 flows back to block 510 to continue providing the parameter. If the parameter is selected, the system 200 correlates the parameter to an algorithm 272, at block 530. Then, at block 540, the device 200 constructs an optimized spanning tree 232 based on the correlated algorithm 272. The optimized spanning tree 232 may improve a performance of the network with respect to the selected parameter.

The correlated algorithm 272 may vary a structure of the optimized spanning tree 232 based on a value entered for the selected parameter. For example, assume the parameter relates to a maximum length for a forwarding path. The corresponding algorithm related to setting a maximum length of a path from at least one of the nodes may construct a different optimized spanning tree for a larger maximum length value, such as 10, compared to a smaller maximum length value, such as 2. The correlated algorithm 272 may set a priority of at least one of the nodes of the network 280 in order to construct the optimized spanning tree 232.

FIG. 6 is another example flowchart of a method 600 for optimized spanning tree construction based on parameter selection. Although execution of the method 600 is described below with reference to the system 200, other suitable components for execution of the method 600 can be utilized, such as the system 100. Additionally, the components for executing the method 600 may be spread among multiple system and/or devices (e.g., a processing device in communication with input and output devices). In certain scenarios, multiple devices acting in coordination can be considered a single device to perform the method 600. The method 600 may be implemented in the form of executable instructions stored on a machine-readable storage medium, such as storage medium 420, and/or in the form of electronic circuitry.

At block 610, the device 200 collects topological information about at least one of the nodes of the network 280. The information relates to at least one of a physical and an active topology of the network 280. Next, at block 620, the device 200 organizes the collected topological information into a database format. Then, at block 630, the device 200 updates a database 270 with the organized topological information. During a period previous to, simultaneous with and/or subsequent to the operation of the blocks 610, 620 and 630, the system 200 may also provide a parameter of the network 280 during the block 640, and then flow to block 650 to determine if the parameter is selected. If the parameter is not selected, the system 200 flows back to block 640 to continue providing the parameter. If the parameter is selected, the system 200 correlates the parameter to an algorithm 272, at block 660.

Then, at block 670, the device 200 constructs an optimized spanning tree 232 based on the database 270. Lastly, at block 680, the device 200 modifies a current spanning tree constructed for the network 280 based on the optimized spanning tree 232. For example, the system 200 may reassign the priority of at least one of the nodes of the network 280 based on a difference between the current spanning tree and the optimized spanning tree 23, such that the optimized spanning tree is implemented on the network 280 instead of the current spanning tree. The optimized spanning tree 232 may improve a performance of the network 280 with respect to the selected parameter.

Specific details are given in the above description to provide an understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

I claim:

1. A method, comprising:
providing a parameter of a bridged packet-switched network;
correlating the parameter to an algorithm if the parameter is selected; and
constructing an optimized spanning tree if the parameter is correlated to the algorithm, the optimized spanning tree to improve a performance of the network with respect to the selected parameter.

2. The method of claim 1, wherein the parameter relates to at least one of aggregate link bandwidth utilization, a length of a forwarding path, a bandwidth at a node and a maintainability of an active topology of the network with a disturbance.

3. The method of claim 2, wherein the algorithm relates to at least one of minimizing communication between nodes, setting a maximum length of a path from at least one of the nodes, setting a maximum bandwidth through at least one of the nodes, and allocating bandwidth between a plurality of the nodes.

4. The method of claim 3, wherein,
the correlated algorithm is to vary a structure of the optimized spanning tree based on a value entered for the selected parameter, and
the correlated algorithm sets a priority of at least one of the nodes of the optimized spanning tree.

5. The method of claim 1, further comprising:
modifying a current spanning tree constructed for the network based on the optimized spanning tree, wherein
the modifying includes reassigning the priority of at least one of the nodes based on a difference between the current spanning tree and the optimized spanning tree.

6. The method of claim 1, further comprising:
collecting topological information about at least one of the nodes of the network, wherein
the information relates to at least one of a physical and an active topology of the network.

7. The method of claim 6, further comprising:
organizing the collected topological information into a database format; and
updating a database with the organized topological information, wherein
the constructing constructs the optimized spanning tree based on the database.

8. The method of claim 1, wherein
the correlating comprises correlating the parameter to one of a plurality of stored algorithms if the parameter is selected, each of the plurality of stored algorithms to construct a respective one of a plurality of optimized spanning trees, wherein
the constructing comprises constructing one of the plurality of optimized spanning trees if the parameter is correlated to the one of the plurality of stored algorithms.

9. The method of claim 1, farther comprising outputting a current spanning tree constructed for the network and optimized spanning tree to the user to allow a user to compare the current spanning tree and the optimized spanning tree.

10. A network management system, comprising:
circuitry to:
provide one or more parameters related to a performance of a bridged packet-switched network to a user interface for selection;
select at least one of a plurality of stored algorithms based on the selected one or more parameters, each of the plurality of stored algorithms to construct a respective one of a plurality of optimized spanning trees;
construct one or more of the optimized spanning trees based on the one or more parameters selected at the user interface, each of the one or more optimized spanning trees optimized according to at least one of the one or more parameters;
determine a priority of a node of the one or more optimized spanning trees based on the one or more selected parameters.

11. The system of claim 10, further comprising:
the circuitry to collect information related to at least one of a physical and an active topology of the network, wherein
the circuitry is to communicate with at least one of the nodes to collect the information.

12. The system of claim 11, further comprising:
the circuitry to organize the collected information into a format; and
a database to store the organized information.

13. The system of claim 12,
wherein the circuitry is to output the one or more optimized spanning trees to a display based on the at least one selected algorithm and the organized information, and
the database is to store the plurality of algorithms.

14. The system of claim 10, wherein,
at least one of the nodes of the one or more optimized spanning trees corresponds to a bridge,
at least one edge of the one or more optimized spanning trees corresponds to a link connecting to at least one of the bridges, and
the network is a mesh network and the bridge is a Layer 2 switch.

15. The system of claim 10, wherein the circuitry is to output a current spanning tree constructed for the network and the one or more optimized spanning trees to the user to allow a user to compare the current spanning tree and the one or more optimized spanning trees.

16. A non-transitory computer-readable storage medium storing instructions that, if executed by a processor of a device, cause the processor to:
collect topological information about a bridged packet-switched network;
correlate a selected parameter related to a performance of the network to an algorithm; and
construct an optimized spanning tree based on the parameter and topological information, a priority of a node of the optimized spanning tree based on the correlated algorithm; and
output the optimized spanning tree to a user.

17. The non-transitory computer-readable storage medium of claim 16, further comprising instructions that, if executed by the processor, cause the processor to:
provide a plurality of parameters of a bridged packet-switched network to the user for selection, one of the plurality of parameters selected by the user to be the selected parameter.

18. The non-transitory computer-readable storage medium of claim 17, wherein,
the parameter relates to at least one of aggregate link bandwidth utilization, a length of a forwarding path, a bandwidth at a node and a maintainability of an active topology of the network with a disturbance, and the algorithm relates to at least one of minimizing communication between nodes, setting a maximum length of a path from at least one of the nodes, setting a maximum bandwidth through at least one of the nodes, and allocating bandwidth between a plurality of the nodes.

19. The non-transitory computer-readable storage medium of claim 16, wherein the correlating comprises correlating the selected parameter to one of a plurality of stored algorithms, each of the plurality of stored algorithms to construct a respective one of a plurality of optimized spanning trees, wherein the constructing comprises constructing one of the plurality of optimized spanning trees based on the parameter and topological information.

20. The non-transitory computer-readable storage medium of claim 16, wherein outputting the optimized spanning tree to a user comprises outputting a current spanning tree constructed for the network and the one or more optimized spanning trees to the user to allow a user to compare the current spanning tree and the one or more optimized spanning trees.

\* \* \* \* \*

UNITED STATES PATENT AND TRADEMARK OFFICE
CERTIFICATE OF CORRECTION

PATENT NO. : 8,675,523 B2
APPLICATION NO. : 13/483498
DATED : March 18, 2014
INVENTOR(S) : Byung Kyu Choi Page 1 of 1

It is certified that error appears in the above-identified patent and that said Letters Patent is hereby corrected as shown below:

In the Claims:

In column 9, line 62, in Claim 9, delete "farther" and insert -- further --, therefor.

Signed and Sealed this
Twelfth Day of August, 2014

Michelle K. Lee
*Deputy Director of the United States Patent and Trademark Office*